United States Patent [19]

Ueyoko et al.

[11] Patent Number: 5,160,384
[45] Date of Patent: Nov. 3, 1992

[54] HIGH SPEED HEAVY DUTY TIRE INCLUDING BEAD PART WITH SIDE PACKING RUBBER

[75] Inventors: Kiyoshi Ueyoko, Osaka; Hiroshi Hoshino, Kobe, both of Japan

[73] Assignee: Sumitomo Rubber Industries, Limited, Hyogo, Japan

[21] Appl. No.: 632,006

[22] Filed: Dec. 21, 1990

[30] Foreign Application Priority Data

Dec. 28, 1989 [JP] Japan .................. 1-344638

[51] Int. Cl.$^5$ ............... B60C 15/06; B60C 13/00
[52] U.S. Cl. ..................... 152/454; 152/525; 152/543; 152/546; 152/547
[58] Field of Search ............ 152/454, 547, 555, 543, 152/539, 525, 546

[56] References Cited

U.S. PATENT DOCUMENTS

| | | | |
|---|---|---|---|
| 3,052,275 | 9/1962 | Hylbert, Jr. | 152/547 X |
| 3,612,138 | 10/1971 | Ravenhall | 152/555 X |
| 4,006,766 | 2/1977 | Takayanagi et al. | 152/209 R |
| 4,046,183 | 9/1977 | Takahashi et al. | 152/547 X |
| 4,086,948 | 5/1978 | Suzuki et al. | 152/547 X |
| 4,139,040 | 2/1979 | Samoto et al. | 152/547 X |
| 4,726,408 | 2/1988 | Alie et al. | 152/547 X |
| 5,007,472 | 4/1991 | Kuze et al. | 152/555 X |
| 5,085,260 | 2/1992 | Vexoko et al. | 152/539 X |

FOREIGN PATENT DOCUMENTS 57-182502 11/1982 Japan ................... 152/543

Primary Examiner—Michael W. Ball
Assistant Examiner—Adrienne C. Johnstone
Attorney, Agent, or Firm—Birch, Stewart, Kolasch & Birch

[57] ABSTRACT

A high speed tire for heavy duty vehicles includes a carcass in a radial structure, a belt layer, tapered bead apex rubbers, side packing rubbers of small thickness, and side wall rubbers. The carcass has a main body part extending from a tread part through side wall parts to a bead core in each of two bead parts, and folding-back parts each being folded back around the bear core at each edge of the main body. Each of the bead apex rubbers extends outward in the radial direction between the main body part and the folding-back part from the bead core. Each of the side packing rubbers is disposed along the outside surface in the tire axial direction of the carcass. Each of the side wall rubbers covers the packing rubber and extends from the bead part to the side wall part so as to form the outside surface of the tire. Furthermore, the 100% modulus MP of the side packing rubber is 53 to 95 kg/cm$^2$, the 100% modulus MA of the bead apex rubber is 78 to 120 kg/cm$^2$, the 100% modulus MS of the side wall rubber is 14 to 50 kg/cm$^2$, and these 100% modulus MP, MA, MS are in the relation of MS<MP<MA.

2 Claims, 2 Drawing Sheets

HIGH SPEED HEAVY DUTY TIRE INCLUDING BEAD PART WITH SIDE PACKING RUBBER

BACKGROUND OF THE INVENTION

1. Field of the Invention

The present invention relates to a high speed tire for heavy duty vehicles capable of reducing the bead deformation and bead heat generation so as to suppress bead damage and enhance durability of the tire.

2. Description of Related Art

Recently, in tires used in heavy duty and high speed conditions such as aircraft tires, the radial structure comes to be employed for the purposes of structural durability, running performance and fuel consumption. In such aircraft tires, however, since they are used under conditions of high internal pressure, heavy load and high speed, a greater durability is required as compared with tires used in other fields. Especially the bead part is likely to be peeled or damaged in the carcass end part and its vicinity due to the strain caused by bending deformation by a large load at the time of taking off or landing. Therefore, it was previously attempted to suppress bending deformation by increasing the bead volume or by enhancing the bead rigidity with a reinforcement layer made of organic or inorganic fiber cords.

With such rigidity reinforcing measures, however, the internal heat generation due to bending deformation cannot be decreased, and satisfactory preventive effects of bead part damages could not be obtained.

SUMMARY OF THE INVENTION

The present inventors accordingly accumulated various studies about the bending deformation of the bead part by employing the takeoff taxi simulation tests and others conforming to the Federal Aviation Administration Technical Standard Order TSO-C62c. As a result, comparing the tire bead part A0 without load and the tire bead part A1 with specified load as shown in FIG. 2, as being mounted on specified rim R and inflated with a specified internal pressure, it has been found that the internal heat generation of the bead part is lower when the bead deformation h0-h1 is smaller, which is the difference between the initial height h0 and the loaded height h1, or the length between the outer surface of the bead parts A0, A1 on the vertical line set up from the outer edge of, for example, rim flange Ra, and the upper edge of the rim flange Ra as shown in FIG. 3. It is also known that the heat generation of the bead part is rather increased when the rigidity is increased by increasing the thickness of the bead parts, especially the clinch thickness which is the thickness in the flexural part, in order to decrease the bead deformation h0-h1.

The present inventors further accumulated research, and discovered that the loaded height h1 is increased to decrease the bead deformation h0-h1, without practically changing the initial height h0, by employing the high modulus rubber as a bead apex, and that the shearing stress occurring in the bead part in a loaded state can be lessened to enhance the bead durability by decreasing the modulus from inside to outside in the tire axis direction.

It is hence a primary object of the invention to present a high speed tire for heavy duty vehicles capable of decreasing the bead part bending deformation and bead heat generation so as to suppress damage to the bead.

According to one aspect of the invention, a high speed tire for heavy duty vehicles comprises; a carcass in a radial structure having a main body part extending from a tread part through side wall parts to a bead core in each of two bead parts, and folding-back parts each being folded back around the bead core at each edge of the main body; a belt layer disposed outside in the tire radial direction of the carcass; tapered bead apex rubbers each extending outward in the radial direction between the main body part and the folding-back part from the bead core; side packing rubbers of small thickness each disposed along the outside surface in the tire axial direction of the carcass; and side wall rubbers each covering the packing rubber and extending from the bead part to the side wall part so as to form the outside surface of the tire. Further, the 100% modulus MP of the side packing rubber is set to be 53 to 95 kg/cm$^2$, the 100% modulus MA of the bead apex rubber is set to be 78 to 120 kg/cm$^2$, the 100% modulus MS of the side wall rubber is set to be 14 to 50 kg/cm$^2$, and these 100% modulus MP, MA, MS are in the relation of $MS < MP < MA$.

Preferably, the height HP of the side packing rubber in the radial direction from the bead bottom line to the upper end thereof is greater than the height HA of the bead apex rubber from the bead bottom line to the upper end thereof and smaller than $\frac{1}{2}$ of the tire sectional height H, and the height HA of the bead apex rubber is greater than the rim flange height HR from the bead bottom line to the upper end thereof.

As a bead apex rubber, a high hardness rubber with the modules at 100% stretch (hereinafter called 100% modulus) of 78 to 120 kg/cm$^2$ is used. As a result, the rigidity of the bead part is increased, and the bead deformation h0-h1 is decreased. Further, as a side wall rubber, a soft rubber with the 100% modulus of 14 to 50 kg/cm$^2$ is used, and a side packing rubber with the 100% modulus of 53 to 95 kg/cm$^2$ is provided between them. The 100% modulus of the side packing rubber is smaller than that of the bead apex rubber and larger than that of the side wall rubber, so that the shearing stress is decreased so as to enhance the bead part durability while enhancing the rigidity. In this way, the bead damage may be suppressed by the synergistic action of the reducing effect of the bending stress and deformation heat generation by decrease of bead deformation, and alleviating the effect of the shearing stress.

BRIEF DESCRIPTION OF THE DRAWINGS

Embodiments will now be disclosed by way of example only in conjunction with the attached drawings, in which.

DETAILED DESCRIPTION OF PREFERRED EMBODIMENTS

Figure 1:
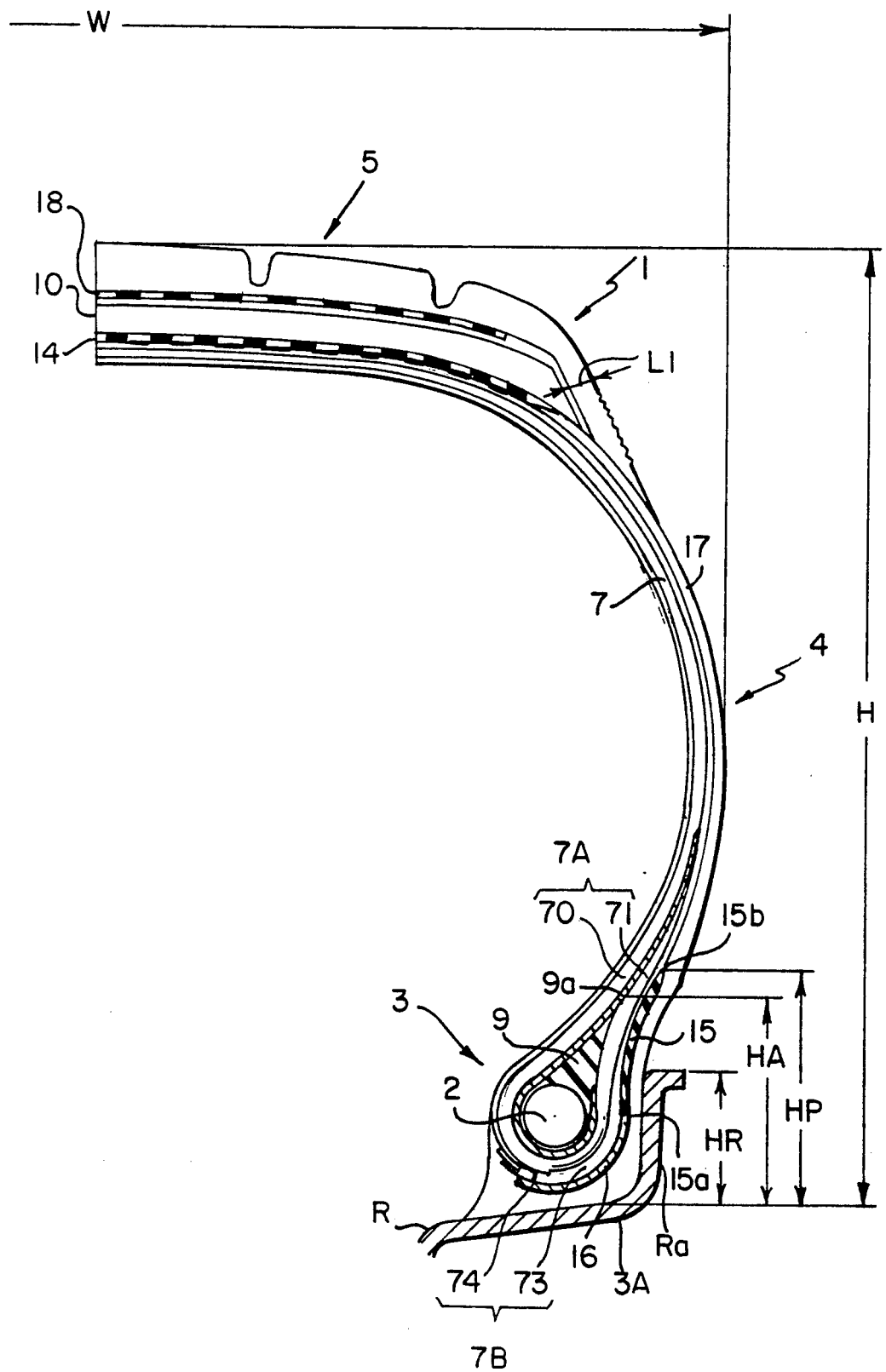
FIG. 1 is a sectional view showing an embodiment of the invention.
Figure 2:
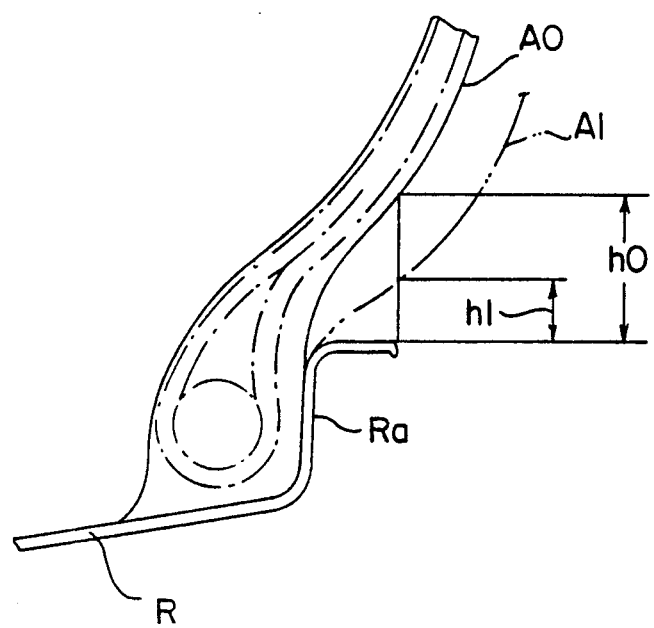
FIG. 2 is a schematic diagram showing the bending deformation state of the bead part.
Figure 3:
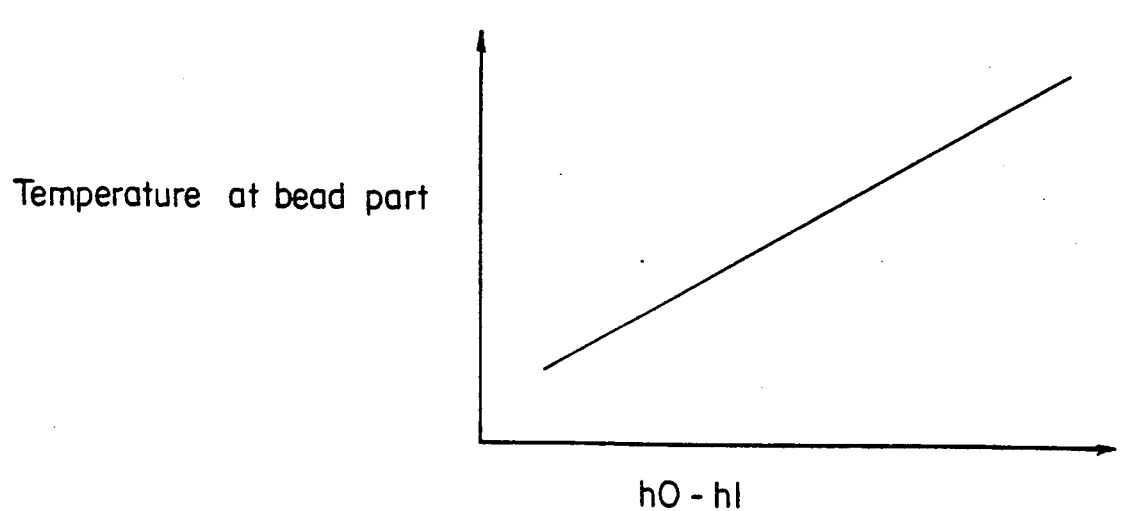
FIG. 3 is a diagram showing the relation between the bead outer surface heights h0, h1 and the bead part temperature.

FIG. 1 shows a sectional view of a 46×17R20 radial tire for an aircraft which is mounted on a specified rim R and inflated with a specified internal pressure. In FIG. 1, a high speed tire for heavy duty vehicles 1 (hereinafter called tire 1) comprises a bead part 3 with an annular bead core 2 through it, a side wall part 4 consecutive to the bead part 3 and extending outward in the tire radial direction, and a tread part 5 which is linked between the outer ends of the two side wall parts 4.

In addition, the tire 1 also has a carcass 7 consisting of an inner layer 7A composed of plural, for example, four inner plies folding back the bead core 2 from inside to outside of the tire, and an outer layer 7B composed of plural, for example, two outer plies enclosing the folding-back portion of the inner layer 7A from outside to inside of the tire.

The inner layer 7A has a folding-back part 71 for folding back the bead core 2 at the both ends of a toroidal main body part 70 passing through the tread part and side wall part. The outer layer 7B has a wrapping part 74 enclosing the folding-back part 71 from outside to inside of the bead core 2 at the both ends of a toroidal main body part 73.

The inner plies and outer plies include, in this example, carcass cords of organic fiber cords, and the carcass cords are arranged in a radial direction having an inclination of 70 to 90 degrees to the tire's equator. And in this example, the carcass 7 has the carcass cords crossed and inclined alternately in the circumferential direction between adjacent carcass plies. As the organic fiber cords, meanwhile, rayon, polyester, vinylon, nylon, aromatic polyamide, and others may be used.

In addition, between the main body part 70 and the folding-back part 71 of the inner layer 7A of the carcass 7, there is a bead apex rubber 9 extending outward in the radial direction from the bead core 2. Further, a side packing rubber 15 with a small thickness, extending inward and outward in the radial direction along the outer surface of the main body part 73 of the carcass 7, is provided in the bead part 3. The lower end 15a of the side packing rubber 15 is terminated on the side of the bead core 2, in this embodiment, at the upper end of the reinforcement filler 16 which extends on the bottom surface of the wrapping part 74. The side packing rubber 15 is covered with a side wall rubber 17 which forms the outer side surface of the tire from the bead part 3 to the side wall part 4.

The tread part 5 has a belt layer 10 positioned outside in the radial direction of the carcass 7 and in its inside. In this embodiment, a cut breaker 14 is intervening between the belt layer 10 and the carcass 7.

The belt layer 10 is composed of plural, for example, eight belt plies.

The cut breaker 14 is composed of, for example, two cut breaker plies. This cut breaker 14 runs along the carcass 7 in the middle part of the tread across the tire's equator, and is gradually spaced from the carcass 7 in its outward direction, and its outer end is terminated at the position of about 65 to 85% of the tire maximum width W, preferably, at a position in a range of about 70 to 78%.

The belt layer 10 further is superimposed on the cut breaker 14, and its outer end extends over outward the outer end of the cut breaker 14. And its outer end is aligned on the slope along the outer tire surface. The belt width is in a range of about 70 to 85% of the tire maximum width W, and the shortest distance L1 from the belt outer end to the tire outer surface is set in a range of about 3 to 15 mm.

The belt cords for forming the belt plies are made of elastic cords of low elasticity, and the belt cords are disposed parallel at an inclination of 0 to 20 degrees to the tire's equator.

The outer surface of the belt layer 10 is coated with a protective layer 18 for enhancing the cutting resistance.

In this invention, incidentally, the 100% modulus MP of the side packing rubber is set to be 53 to 95 kg/cm$^2$, the 100% modulus MA of bead apex rubber is set to be 78 to 120 kg/cm$^2$, and the 100% modulus MS of the side wall rubber is set to be 14 to 50 kg/cm$^2$.

What is more, these modulus MP, MA, MS are defined in the relation of MS<MP<MA.

These 100% modulus of the bead apex rubber 9, side packing rubber 15 and side wall rubber 17 are summarized in Table 1, together with the elongation upon rupture (%), the stress upon rupture (kg/cm$^2$), and numerical values of the topping rubbers of the carcass 7.

TABLE 1

|  | 100% modulus | Elongation upon rupture | Stress upon rupture |
| --- | --- | --- | --- |
| Bead apex rubber | 78–120 | 150–200 | 120–160 |
| Side packing rubber | 53–95 | 250–350 | 200–250 |
| Side wall rubber | 14–50 | 400–500 | 170–230 |
| Carcass topping rubber | 40–70 | 200–350 | 150–300 |

Thus, the high hardness rubber with 100% modulus of 78 to 120 kg/cm$^2$ is used as the bead apex rubber 9. As a result, the rigidity of the bead part is heightened, and the bead deformation h0–h1 is decreased. Furthermore, as the side wall rubber 17, relatively soft rubber with 100% modulus of 14 to 50 kg/cm$^2$ is used, and the side packing rubber 15 with 100% modulus of 53 to 95 kg/cm$^2$, being smaller than that of the bead apex rubber 9 and greater than that of the side wall rubber 17 is provided between them. Thereby, the step difference of rigidity is decreased while further raising the rigidity, the shearing stress is alleviated, and the bead part durability is enhanced. In this way, the bead damage may be dramatically suppressed by the synergistic actions of the decreasing effects of the bending stress and deformation heat generation by decreasing the bead deformation, and alleviating the effect of the shearing stress.

Furthermore, the side packing rubber 15 has the height HP of its upper end 15b from the bead bottom line 3A in the radial direction defined greater than the height HA of the upper end 9a of the bead apex rubber 9 from the bead bottom line 3A, and smaller than ½ of the tire sectional height H. Also, the height HA of the upper end 9a of the bead apex rubber 9 is greater than the rim flange height HR from the bead bottom line 3A to the upper end thereof.

To increase the bending rigidity of the bead part, it is required that the height HA of the upper end 9a of the bead apex rubber 9 is greater than the height HR of the rim flange Ra, and by setting the height HP of the upper end 15b of the side packing rubber 15 greater than this height HR, the bending rigidity at the bead part is effectively heightened. It is, meanwhile, not necessary to set this height HP greater than ½ of the tire section height H.

[EXAMPLES]

Aircraft tires having the tire structure as shown in FIG. 1 and the tire size of 46×17R20 are manufactured, together with comparative examples, by varying the 100% modulus of the bead apex rubber, and side packing rubber, side wall rubber as shown in Table 2. The trial tires were subjected to the taxi simulation condition test (load 100%) to measure the repeated bead durability in accordance with the Federal Aviation Administration Technical Standard Order TSO-C62c, and the results are shown in the table by the index taking the embodiment as 100. The greater the index, the more preferable. The embodiments are known to be excellent in bead durability. As compared with the tire of reference 2, the embodiment was lower in the bead part temperature by about 5 deg. C. in the same conditions, and the bead deformation was decreased about 1 to 1.5%.

TABLE 2

|  | 100% modulus | Result | Evaluation |
|---|---|---|---|
| Embodiment | MA > MP > MS | Completed 300 test cycles | 100 |
| Reference 1 | MA > MS > MP | Looseness occurred in the initial stage of test between the carcass plies and side packing rubber at the flange contact region of the beade part. | 30 |
| Reference 2 | MP > MS > MA | the same as the above | 40 |
| Reference 3 | MS > MP > MA | the same as the above | 30 |
| Reference 4 | MA > MP = MS | Completed 300 test cycles, but looseness occurred in the inner plies. | 80 |

*MA: Bead apex rubber
*MP: Side packing rubber
*MS: Side wall rubber

What is claimed is:

1. A high speed tire for heavy duty vehicles comprising:
    a carcass in a radial structure composed of a plurality of inner plies and a plurality of outer plies, each of said plurality of inner plies having a main body part extending from a tread part through side wall parts to a bead core in each of two bead parts, and a folding-back part folded back at each edge of the main body part around the bead core from axially inside to outside, said outer plies having a wrapping part enclosing the folding-back part around the bead core from axially outside to inside at each edge of a main body extending from the tread part through the side wall parts to the bead core;
    a belt layer disposed outside of the carcass in the tire radial direction;
    tapered bead apex rubbers each extending from the bead core outward in the radial direction between the main body part and the folding-back part;
    side packing rubbers of small thickness each extending radially outwardly along the outside surface of the main body, each side packing rubber terminating on the outer side of the bead core at an upper end of a reinforcement filler extending on the bottom surface of the wrapping part; and
    side wall rubbers each covering a packing rubber and extending from the bead part to the side wall part so as to form the outside surface of the tire; wherein
    the 100% modulus MP of the side packing rubber is 53-95 kg/sq.cm,
    the 100% modulus MA of the bead apex rubber is 78-120 kg/sq.cm,
    the 100% modulus MS of the side wall rubber is 14-50 kg/sq.cm, and
    the 100% modulus MP, MA, MS are in the relation of MS<MP<MA.

2. A high speed heavy duty tire-rim assembly including the high speed tire for heavy duty vehicles according to claim 1, wherein the height HP of the side packing rubber in the radial direction from a bead bottom line to the upper end thereof is greater than the height HA of the bead apex rubber from the bead bottom line to the upper end thereof and smaller than ½ of a tire sectional height H, and the height HA of the bead apex rubber is greater than a rim flange height HR from the bead bottom line to the upper end thereof.

* * * * *